United States Patent [19]
Tobita et al.

[11] Patent Number: 5,674,147
[45] Date of Patent: Oct. 7, 1997

[54] TRANSMISSION SYSTEM

[75] Inventors: Kenichi Tobita, Zama; Tsutomu Niimi, Isehara, both of Japan

[73] Assignee: Nissan Motor Co., Ltd., Yokohama, Japan

[21] Appl. No.: 531,442

[22] Filed: Sep. 21, 1995

[30] Foreign Application Priority Data

Sep. 21, 1994 [JP] Japan .................................. 6-226463

[51] Int. Cl.$^6$ ........................................ F16H 3/62
[52] U.S. Cl. ................... 475/295; 475/332; 180/249; 74/665 GA
[58] Field of Search .................. 74/665 GA, 665 GE; 475/295, 332, 346; 180/248, 249

[56] References Cited

U.S. PATENT DOCUMENTS

| | | | |
|---|---|---|---|
| 4,444,073 | 4/1984 | Moroto et al. | 475/295 X |
| 4,458,557 | 7/1984 | Hayakawa | 475/295 X |
| 4,854,413 | 8/1989 | Kameda et al. | 74/665 GE X |
| 4,878,399 | 11/1989 | Kameda | 74/665 GA X |
| 5,099,704 | 3/1992 | Williams et al. | 475/346 X |
| 5,275,253 | 1/1994 | Sperduti et al. | 180/248 X |
| 5,334,116 | 8/1994 | Baxter, Jr. | 180/249 X |
| 5,409,429 | 4/1995 | Showalter et al. | 475/295 |
| 5,520,590 | 5/1996 | Showalter et al. | 475/295 |

FOREIGN PATENT DOCUMENTS

5-213086  8/1993  Japan.

Primary Examiner—Charles A. Marmor
Assistant Examiner—Peter T. Kwon
Attorney, Agent, or Firm—Foley & Lardner

[57] ABSTRACT

A sub-transmission of a transfer unit includes a shift sleeve that moves to a neutral position N where it does not engage with a high-speed gear set to an input shaft or a low-speed gear set to a deceleration system, and thereafter engages with the high- or low-speed gear to transfer the driving force of the input shaft to an output shaft in the form of a high-speed or low-speed driving force. The output shaft has an outer periphery provided with an annular friction member in contact with the input shaft, for reducing the rotational speed of the input shaft, and thereby decreasing gear screeches during a changeover between low- and high-speed positions, even if a free-running torque is transferred to the input shaft from a hydrodynamic automatic transmission.

4 Claims, 8 Drawing Sheets

FIG. 1

FIG_2

TRANSMISSION SYSTEM

BACKGROUND OF THE INVENTION

1. Field of the Invention

The present invention relates to a transmission system, specifically, to such a transmission system particularly suitable for a sub-transmission of a transfer unit for changing a transferred driving force to a high- or low-speed driving force and distributing the driving force to the front and rear wheels.

2. Description of the Related Art

Figure 10:
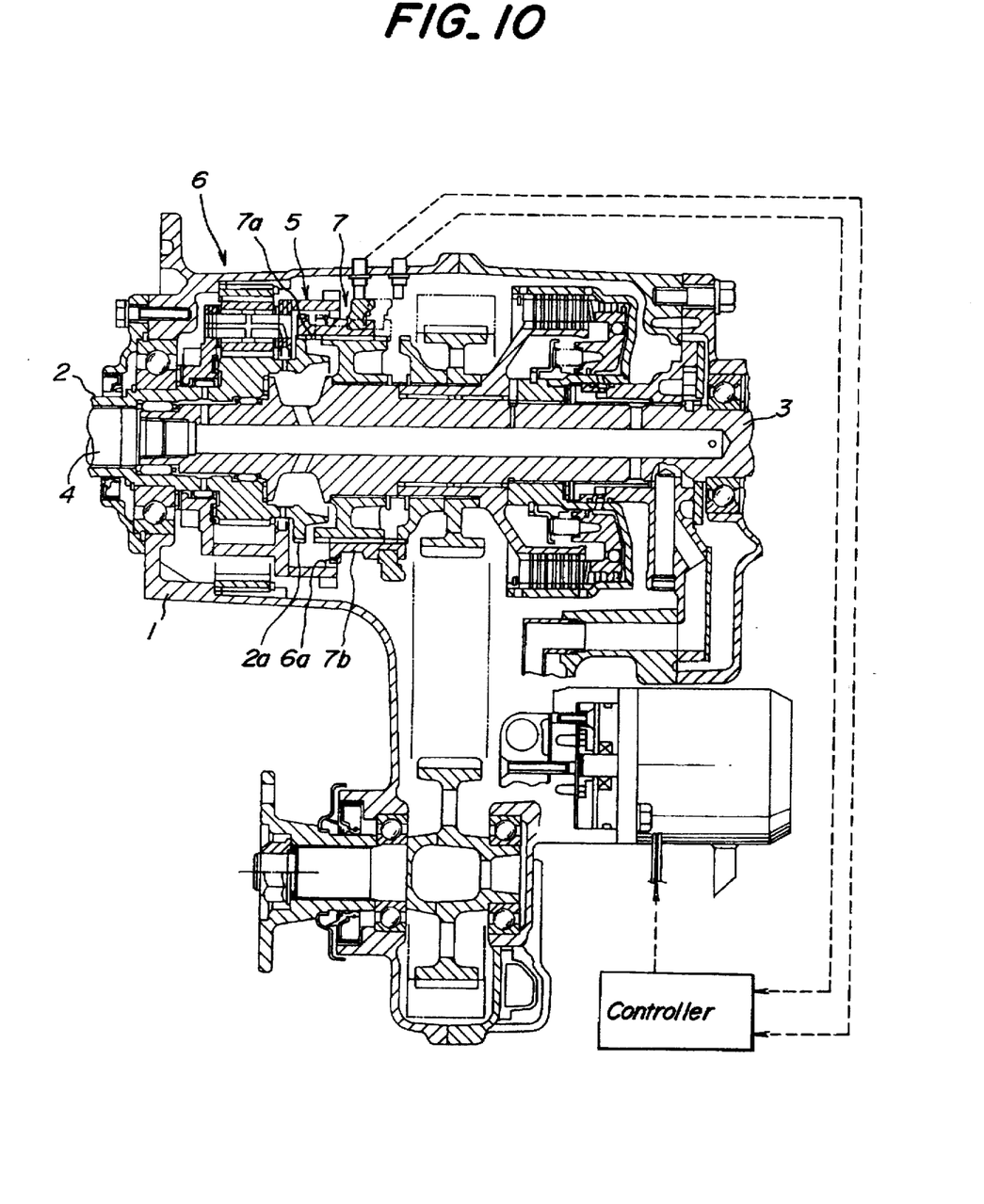
FIG. 10 is an illustration showing a sub-transmission of a conventional transfer unit.

FIG. 10 shows part of a transfer unit disclosed in Japanese Patent Laid-open Publication No. 5-213086. The transfer unit disclosed therein includes a housing 1 in which an input shaft 2 and an output shaft 3 are faced each other and relatively rotatably arranged in a coaxial manner. Also arranged in the transfer casing 1 is a sub-transmission 5 for transferring a driving force transferred from a transmission (not shown) to the input shaft 2 through a power transmission shaft 4 to the output shaft 3 as a high- or low-speed driving force.

The sub-transmission 5 comprises a planetary gear set 6 and a shift sleeve 7 arranged coaxially to the planetary gear set 6. When a high-speed position is selected, the shift sleeve 7 moves to an upper position in FIG. 10, so that a high-speed shift gear 2a provided on the input shaft 2 engages with an internal gear of the shift sleeve 7, to transfer the rotational driving force of the input shaft to the output shaft 3 as a high-speed rotational driving force.

To perform a changeover from low- to high-speed positions, the shift sleeve 7 temporarily moves rightward in FIG. 10 to assume a neutral position in which the internal gear 7a and external gear 7b do not engage with other gears. When the sleeve 7 further moves rightward, low-speed shift gears 6a of the planetary gear set 6 engage with the external gear 7b so that the rotational driving force of the input shaft 2 is transferred to the output shaft 3 as a low-speed Rotational driving force due to a reduced rotational speed of the planetary gear set 6 (see the lower position in FIG. 10).

To perform a changeover from low- to high-speed positions, the shift sleeve 7 first passes through the neutral position and thereafter moves up to the position shown at the upper side in FIG. 10. However, if a hydrodynamic automatic transmission including a torque converter is used as a transmission for transferring a rotational driving force to the input shaft 2, gear screeches may occur in the sub-transmission 5 of the transfer unit shown in FIG. 10, when the changeover is performed. That is, when a neutral state of the automatic transmission is selected, a free-running torque, i.e., a slight torque insufficient to rotate the output shaft 3 is commonly transferred to the power transmission shaft 4.

The changeover between high- and low-speed positions of the sub-transmission 5 is usually performed when the neutral state of the automatic transmission is selected. Therefore, when the shift sleeve 7 moves to the neutral position during a changeover, the input shaft 2 with no load rotates due to the free-running torque transferred to the shaft 2 from the power transmission shaft 4, simultaneously causing the planetary gear set 6 to rotate. When the shift sleeve 7 moves to the high- or low-speed position, the internal gear 7a or the external gear 7b of the sleeve 7 collides with the rotating high speed gear 2a or low-speed gear 6a to produce gear screeches.

SUMMARY OF THE INVENTION

The present invention contemplates to solve the above problem, and provide a transmission system that makes it possible to reduce gear screeches during a shift changeover between high- and low-speed positions, even if a hydrodynamic automatic transmission is used and a free-running torque is transmitted to the input shaft.

According to a first aspect of the present invention, there is provided a transmission comprising an input shaft for receiving a driving force and an output shaft, which are facing each other and relatively rotatably arranged in a coaxial manner for transferring the driving force of the input shaft to the output shaft as a high- or low-speed driving force by engaging with a high or low-speed gear, wherein the output shaft is provided with a friction member in contact with the input shaft for decreasing the rotational speed of the input shaft.

With the above-mentioned arrangement of the transmission according to the present invention, when the input shaft receiving a free-running torque engages with the stopped output shaft, the input shaft is not driven by the free-running torque and its rotation is suppressed because the friction member associated with the output shaft is in contact with the input shaft and serves to decrease the rotational speed of the input shaft. Moreover, the noise of collision produced between gears and gear screeches are decreased because the rotation of the input shaft is suppressed when engaging with the low- or high-speed gear.

According to a second aspect of the present invention, there is provided a sub-transmission for a transfer-unit including an input shaft for receiving a driving force from a transmission and an output shaft, which are facing each other and relatively rotatably arranged in a coaxial manner, a high-speed gear formed on the input shaft, a low-speed gear for reducing the rotational speed of the input shaft, and a shift sleeve axially movably arranged on the output shaft for transferring the driving force of the input shaft to the output shaft as a high- or low-speed driving force by engaging with the high- or low-speed gear after the shift sleeve moves beyond a neutral position where the shift sleeve does not engage with the high- or low-speed gear; wherein the output shaft is provided with a friction member in contact with the input shaft, for decreasing the rotational speed of the input shaft.

With the above-mentioned arrangement of the sub-transmission according to the present invention, when an automatic transmission is used as the transmission, a free-running torque is transmitted to the input shaft from the automatic transmission. In this case, by moving the shift sleeve up to the neutral position where it does not engage with the high- or low-speed gear, a free-running torque is transmitted to the input shaft with no load. However, the input shaft is not driven by the free-running torque and its rotation is suppressed because the friction member associated with the output shaft is in contact with the input shaft and serves to decrease the rotational speed of the input shaft. Moreover, when the shift sleeve engages with the high- or low-speed gear, the rotation of the gear is suppressed so that the noise of collision between gears and gear screeches are decreased.

Preferably, the output shaft has an end that is relatively rotatably inserted into an axial recess formed at an opposite end of an input shaft, and wherein the friction member is externally fitted over the end of the output shaft.

In this instance, the friction member can be externally fitted to the end of the output shaft so as to contact the inner periphery of the recess of the input shaft, and it is thus possible to easily set the friction member in the sub-transmission and securely decrease gear screeches during the changeover between high- and low-speed positions.

DETAILED DESCRIPTION OF THE PREFERRED EMBODIMENT

An embodiment of the present invention will now be described below with reference to the accompanying drawings.

Figure 1:
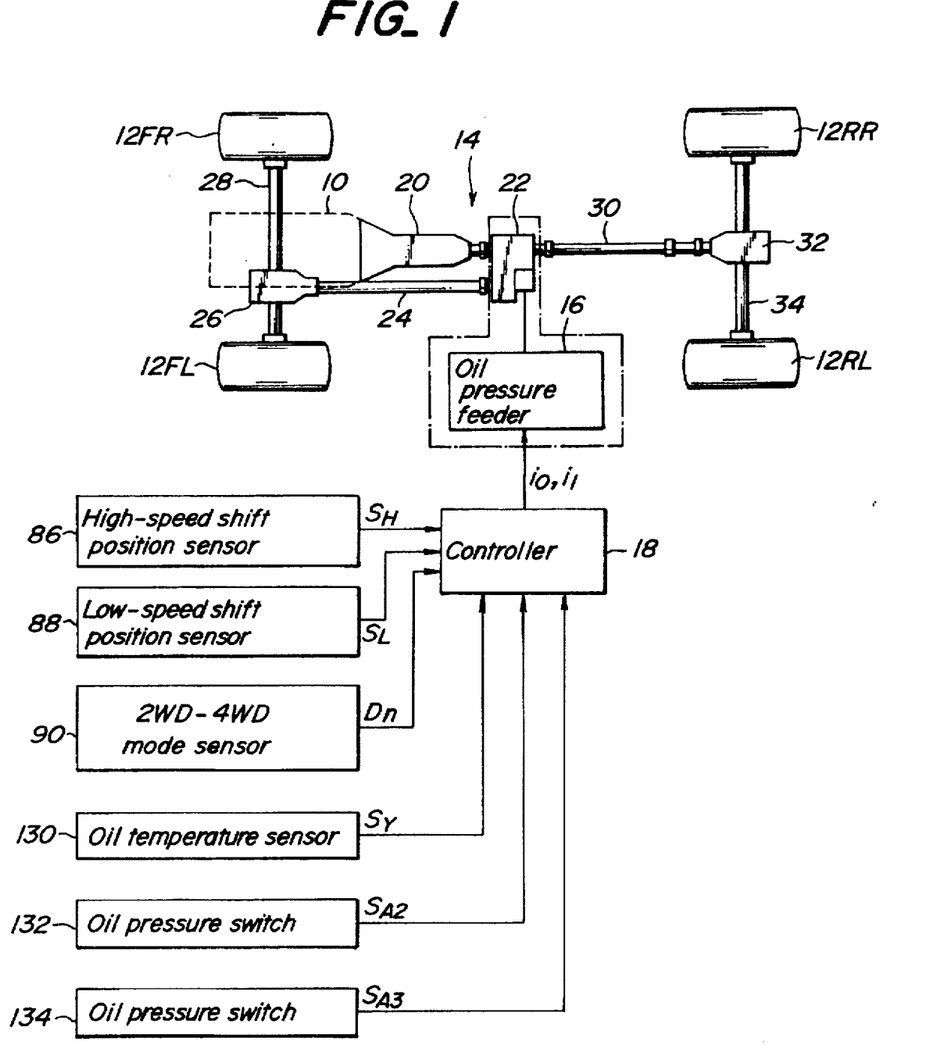
FIG. 1 is a block diagram showing the outline of a four-wheel-drive vehicle to which the transmission system of the present invention can be applied.

FIG. 1 shows a part-time four-wheel-drive vehicle based on FR (front-engine rear-drive) system, which is provided with an engine 10 serving as a rotational driving source, front-left, front-right, rear-left and rear-right wheels 12FL, 12FR, 12RL, 12RR, a driving-force transmission system 14 capable of changing the driving-force distribution ratio for the four wheels 12FL, 12FR, 12RL, 12RR, an oil pressure feeder 16 for feeding an oil pressure to control the driving-force distribution by the driving-force transmission system 14, and a controller 18 for controlling the oil pressure feeder 16.

The driving-force transfer system 14 includes a hydrodynamic automatic transmission 20 provided with a torque converter, for changing the driving force transferred from the engine 10, and a transfer 22 for dividing the driving force transferred from the automatic transmission 20 to a driving force for the front wheels 12FL, 12FR and a driving force for the rear wheels (normally-driven wheels) 12RL, 12RR. In the driving-force transmission system 14, the front-wheel driving force is transferred from the transfer 22 to the front wheels 12FL, 12FR through a front-wheel output shaft 24, a front differential gear set 26 and front-wheel drive shafts 28. Similarly, the rear-wheel driving force is transferred to the rear wheels 12RL, 12RR through a propeller shaft (rear-wheel output shaft) 30, a rear differential gear set 32 and rear-wheel drive shafts 34.

Figure 2:
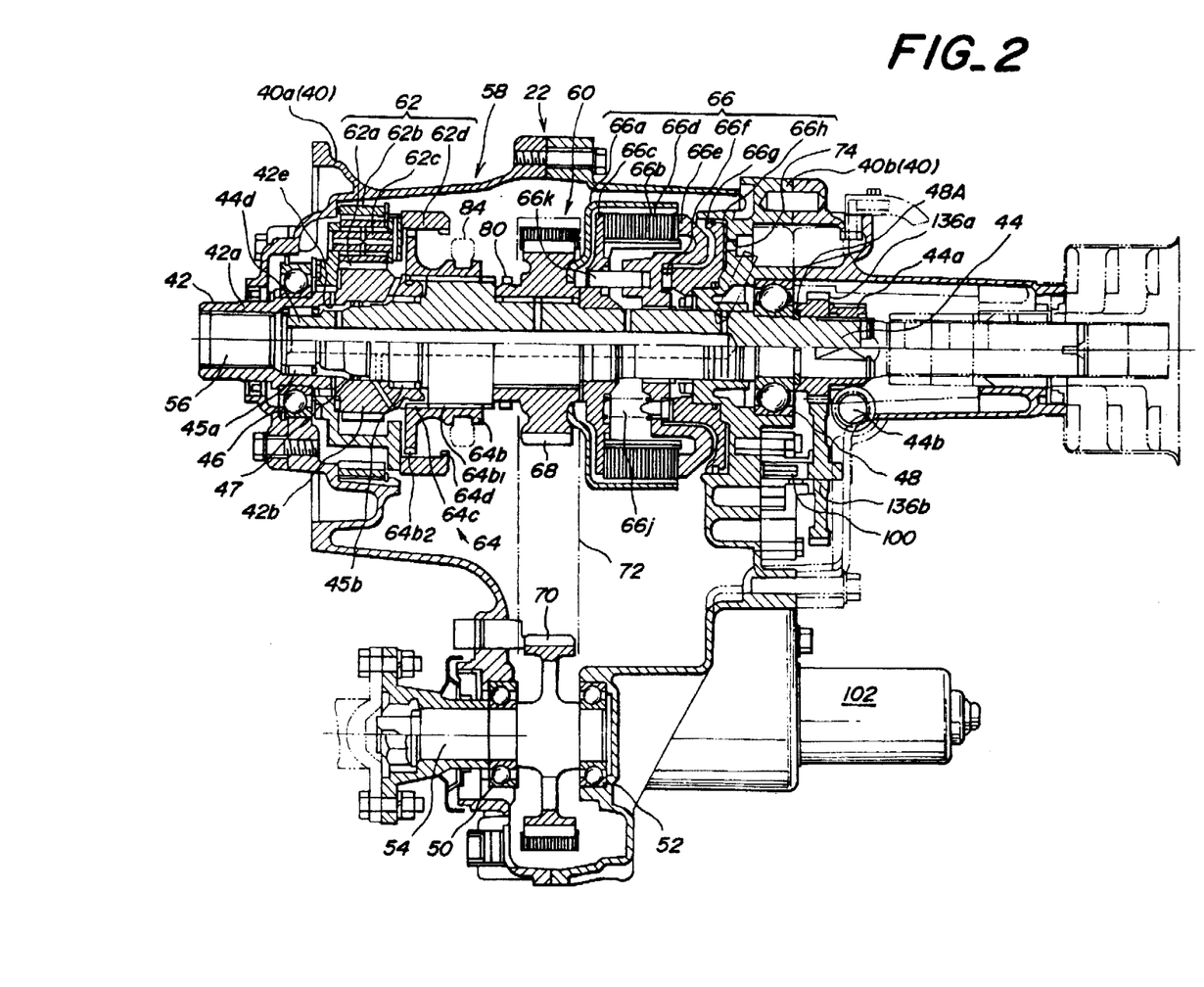
FIG. 2 is a sectional view showing the structure of the transfer unit according to the present invention.

FIG. 2 shows the internal structure of the transfer 22 including a transfer casing 40, and an input shaft 42 and a first output shaft 44, which are facing each other and relatively rotatably arranged in a coaxial manner in the transfer casing 40.

The input shaft 42 is a cylindrical member having inner and outer diameters stepwisely increased from end 42b toward the other end 42b. An output shaft 56 of the automatic transmission 20 is fitted within an inner peripheral section 42e of the one end 42a. An outer peripheral section of the input shaft 42 is rotatably supported by a front casing section 40a of the transfer casing 40 through a radial bearing 46.

The first output shaft 44 has one end 44d inserted into the inner peripheral section 42e of the input shaft 42 and rotatably supported by bearings 45a, 45b, with the other end being connected to the rear-wheel output shaft 30 and relatively rotatably supported by a rear casing section 40b of the transfer casing 40 through a radial bearing 48. The bearing 48 is axially retained by a snap ring 48A secured to the rear-wheel output shaft 30.

A second output shaft 54 of the transfer 22 is rotatably supported through bearings 50, 52 provided for the front casing section 40a and the rear casing section 40b, respectively, in parallel with the input shaft 42 and the first output shaft 44. Furthermore, the second output shaft 54 is connected to the front-wheel output shaft 24.

In this case, friction members 47 in the form of O-rings are arranged at predetermined intervals to the outer periphery of one end 44d of the first output shaft 44, which is inserted into the inner peripheral section 52e of the input shaft 42. These friction members 47 have outer peripheries brought into surface contact with an inner periphery 42c of the inner peripheral section 42e of the input shaft 42. The arrangement is such that when a free-running force is transferred to the output shaft 56 from the automatic transmission 20, the friction members 47 produce a friction force so as to suppress the rotation of the input shaft 42 connected to the output shaft 56.

Furthermore, the input shaft 42 and the first output shaft 44 are provided with a sub-transmission 58 and a 2-wheel and 4-wheel driving changeover mechanism 60.

The sub-transmission 58 comprises a planetary gear set 62 and a high- and low-speed changeover mechanism 64 of the claw-clutch type arranged coaxially to the planetary gear set 62.

The planetary gear set 62 comprises a sun gear 62a formed on the outer periphery of the other side 42b of the input shaft 42, an internal gear 62b secured inside of the front casing section 40a, pinions 62c engaging with the sun gear 62a and the internal gear 62b, and a pinion carrier 62d rotatably supporting the pinions 62c.

Moreover, the high- and low-speed changeover mechanism 64 comprises a shift sleeve 64 slidable in the axial direction by spline-connection with a plurality of key ways formed on the outer periphery of the first output shaft 44 and an internal gear $64b_1$. The shift sleeve 64b has an outer periphery on which an external gear $64b_2$ is arranged, a high-speed shifting gear 64c formed on the outer periphery of the input shaft 42 to be engaged with the internal gear $64b_1$ of the shift sleeve 64b, and a low-speed shift gear 64d formed on the inner periphery of the pinion carrier 62d to be engaged with the external gear $64b_2$ of the shift sleeve 64b.

Figure 3:
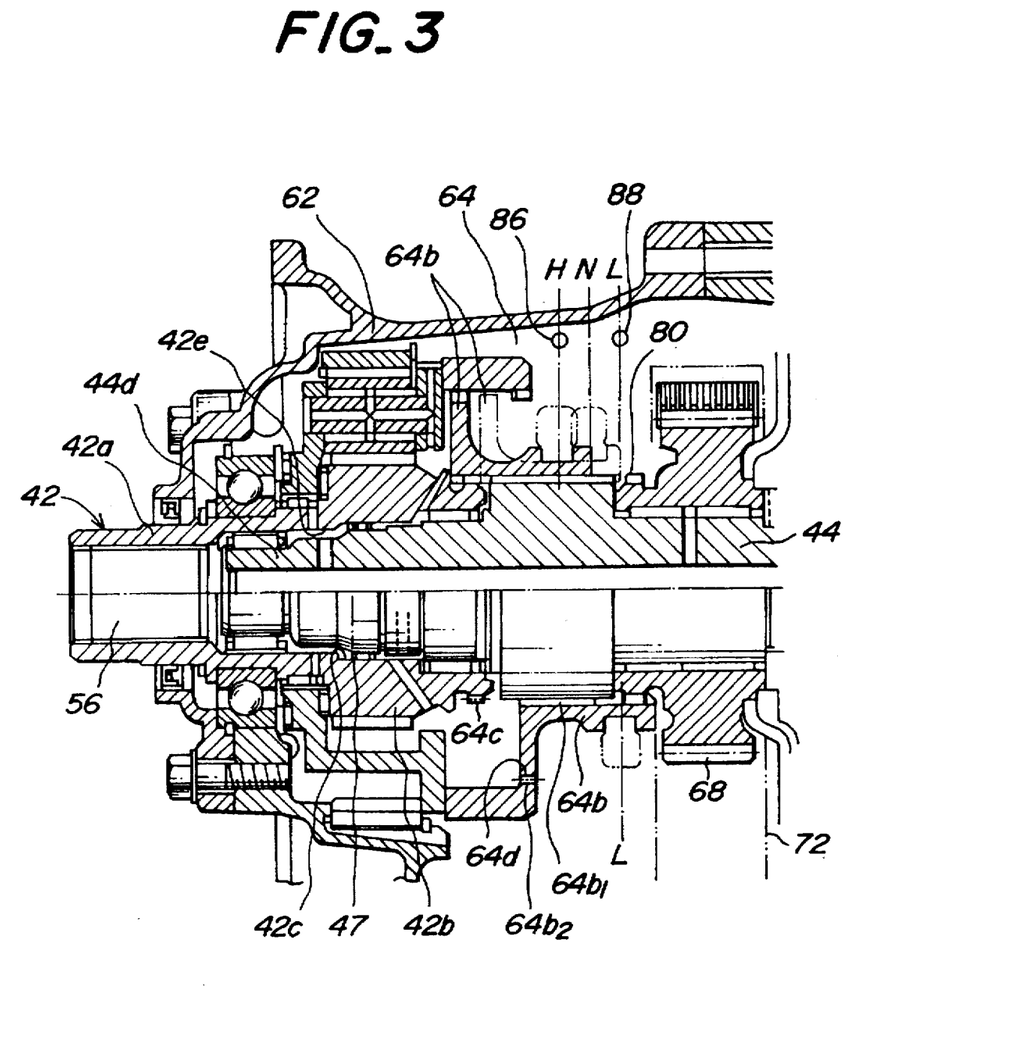
FIG. 3 is an illustration showing the sub-transmission of the present invention.

In the case of the upper-side operational state of the shift sleeve 64b shown by the solid line in FIG. 3, when the shift sleeve 64b slides up to the high-speed shift position shown by symbol H, the high-speed shifting gear 64c engages with the internal gear $64b_1$. In the case of the lower-side operational state of the shift sleeve 64b in FIG. 3, when the shift sleeve 64b slides up to the low-speed shift position shown by symbol L, the low-speed shifting gear 64d engages with the external gear $64b_2$. Moreover, in the case of the upper-side operational state of the shift sleeve 64b shown by the imaginary line in FIG. 3, when the shift sleeve 64b moves up to the neutral position shown by symbol N, the internal gear $64b_1$ and the external gear $64b_2$ do not engage with any other gear of the high- and low-speed changeover mechanism 64.

Referring back to FIG. 24, the 2-wheel and 4-wheel driving changeover mechanism 60 comprises a wet-type multiple-disk friction clutch 66 for changing the driving-force distribution ratio between the front and rear wheels, a first sprocket 68 rotatably provided for the first output shaft 44, a second sprocket 70 coaxially connected with the second output shaft 54, and a chain 72 wound between the first and second sprockets 68 and 70.

The friction clutch 66 comprises a clutch drum 66a connected to the first sprocket 68, friction plates 66b spline-connected to the clutch drum 66a, a clutch hub 66c spline-connected to the outer periphery of the first input shaft 44, friction disks 66d integrated with the clutch hub 66c and arranged between adjacent friction plates 66b, a rotation member 66e arranged on the outer periphery of the first output shaft 44 to make the friction plates 66b contact with the friction disks 66d by moving in the axial direction toward the clutch drum 66a, a pin 66k integrated with the clutch hub 66c to engage the clutch hub 66c with the rotation member 66e, a clutch piston 66g arranged on the inner wall of the rear casing section 40b so that it is movable in the axial direction, a thrust bearing 66f for transferring the axial movement of the clutch piston 66g to the rotation member 66e, a cylinder chamber 66h formed between the inner walls of the clutch piston 66g and the rear casing section 40b, and a return spring 66j for urging the rotation member 66e toward the clutch piston 66g.

When a clutch pressure Pc is fed from the oil pressure feeder 16 to an input port 74 formed in the rear casing section 40b communicating with the cylinder chamber 66h, the clutch piston 66g is moved toward left in FIG. 2 because pressure is produced in the cylinder chamber 66h, and the movement of the clutch piston 66g is transferred to the rotation member 66e through the thrust bearing 66f. Thus, the friction plates 66b and the friction disks 66d, which have been separated from each other, are contacted due to the movement of the friction disks 66d, and a fastening force corresponding to the clutch pressure Pc is produced due to a friction force. Thereby, a rotational driving force of the first output shaft 44 is transferred to the second output shaft 54 through the first sprocket 68, chain 72, and second sprocket 70 at a predetermined torque distribution ratio corresponding to the fastening force of the friction clutch 66.

When the fed clutch pressure Pc lowers, the rotation member 66e and the clutch piston 66g are move toward right in FIG. 2 by the pressure of the return spring 66j, and the friction plates 66b separate from the friction disks 66d, so that the rotational driving force of the first output shaft 44 is not transferred to the second output shaft 54.

Moreover, a four-wheel driving gear 80 is provided on the outer periphery of the first sprocket 68 at the side of the shift sleeve 64b. Therefore, when the shift sleeve 64d moves up to the above-described low-speed position L in FIG. 3, the external gear $64b_2$ engages with the low-speed shifting gear 64d, and the four-wheel driving gear 80 engages with the internal gear $64b_1$. Thereby, the shift-sleeve 64b and the four-wheel driving gear 80 constitute a dog clutch for forcibly connecting the first output shaft 44 and the second output shaft 54 at the low-speed position L.

Then, the shift sleeve 64b of the claw-clutch-type high- and low-speed changeover mechanism 64 slides up to the high-speed shift position H, neutral position N, or low-speed position L through a fork (symbol 84 in FIG. 2 represents the front end of the fork) by manually operating a sub-transmission lever, not shown. In this case, the front casing section 40a is provided with a high-speed shift position sensor 86 for detecting that the shift sleeve 64b slides up to the high-speed shift position H and a low-speed shift position sensor 88 for detecting that the shift sleeve 64b slides up to the low-speed shift position L. Then, a detection signal $S_H$ of the high-speed shift position sensor 86 and a detection signal $S_L$ of the low-speed shift position sensor 88 are input to the controller 18, as will be explained hereinafter.

Figure 4:
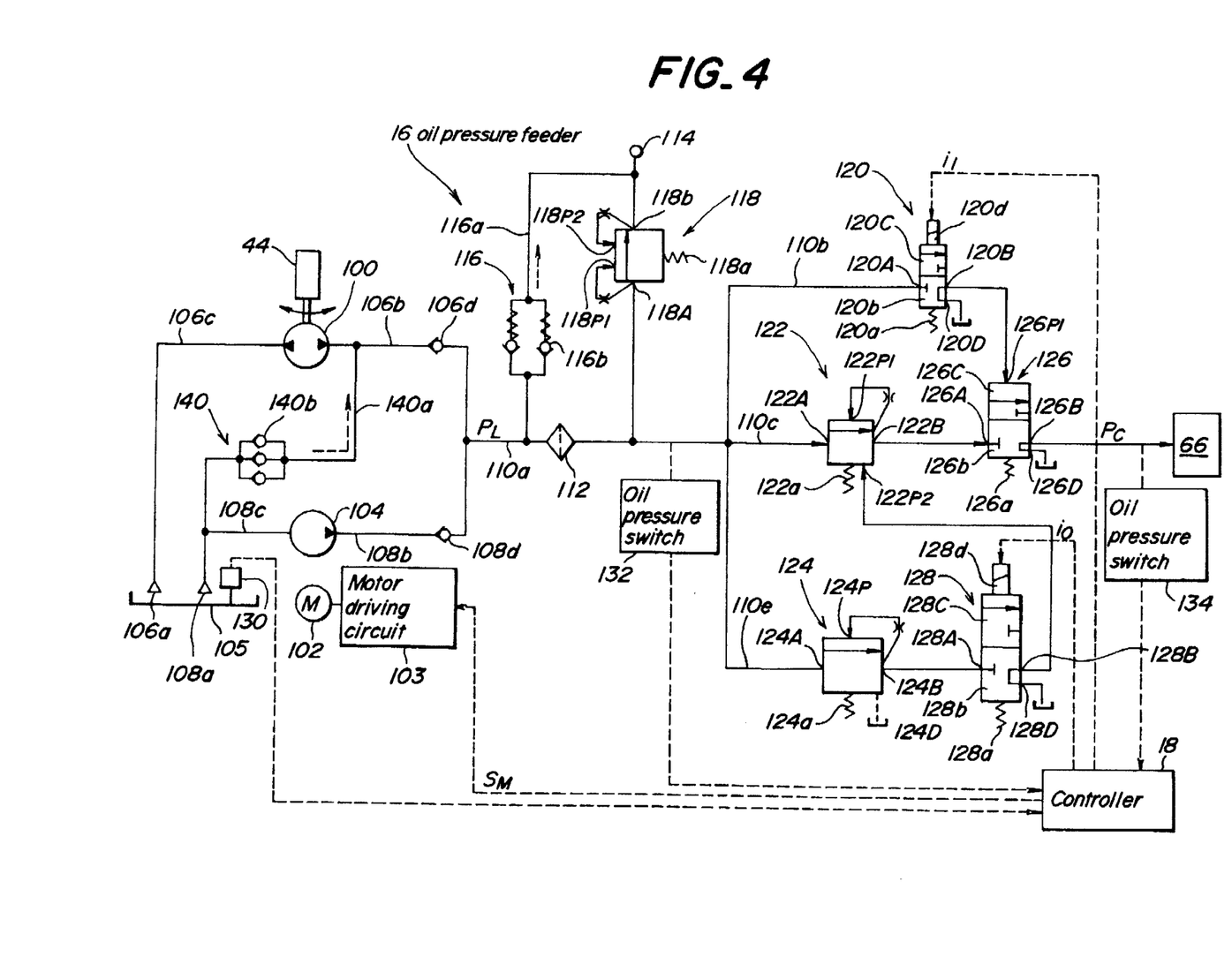
FIG. 4 is a circuit diagram showing the oil pressure feeder of the present invention.

In the case of the oil Pressure feeder 16, a predetermined clutch pressure Pc is fed to the input port 74 of the transfer 22 in accordance with the circuit arrangement shown in FIG. 4.

The oil pressure feeder 16 is associated with a reversible-type main pump 100 directly connected with, and driven by the first output shaft 44, and a sub-pump 1014 connected in parallel with the main pump 100 and driven by an electric motor (sub-motor) 102 as a power source. These pumps are used as oil pressure sources. The main pump 100 and the sub-pump 104 suck hydraulic fluid from an oil tank 105 through strainers 106a and 108a and discharge the hydraulic fluid to discharge-side pipes 106b and 108b. Moreover, an oil element 112 is connected to a collecting pipe 110a for collecting the pipes 106b and 108b, and a relief route 116 having one end 114 in communication with the lubricating system is connected to the upstream side (i.e., on the side of the main-pump 100 and sub-pump 104) of the oil element 112. Moreover, a line-pressure regulating valve 118 is connected to the downstream side of the oil element 112. Input sides of an electromagnetic switching valve 120, a clutch-pressure regulating valve 122 and a pressure reducing valve 124 are respectively connected to pipes 110b, 110c and 110e, which are branched from the collecting pipe 110a. Furthermore, the input side of a pilot selector valve 126 is connected to the output side of the clutch-pressure regulating valve 122, for feeding the clutch pressure Pc to the transfer 22 when applied with a pilot pressure from the electromagnetic switching valve 120. The input side of a duty-control solenoid valve 128 is connected to the output side of the pressure reducing valve 124. A temperature sensor 130 for detecting the temperature of hydraulic fluid is arranged in the oil tank 105. Also, an oil pressure switch 132 for detecting a pressure reduced by the line-pressure regulating valve 116 and a pressure switch 134 for detecting the clutch pressure Pc output from the pilot switching valve 126 are arranged in the tank 105, so that detection signals of these switches are output to the controller 18. Furthermore, the oil pressure feeder 16 is arranged inside the transfer 22, in the case of an actual vehicle. The main pump 100 for sucking hydraulic fluid from the oil tank 105 is connected with the first output shaft 44 through a first gear 136a and a second gear 136b, and the sub-pump 104 is connected to the electric motor 102 arranged outside of the rear casing section 40b.

The structure and function of the above-mentioned components of the oil pressure feeder 16 will be more fully explained below, by referring to FIG. 4. The main pump 100 sucks the hydraulic fluid from the oil tank 105 through the strainer 106a connected to an end of a suction pipe 106c and the sub-pump 104 also sucks the hydraulic fluid from the oil tank 105 through the strainer 108a connected to an end of a suction pipe 108c. Moreover, check valves 106d and 108d are disposed in the discharge pipes 106b and 108b of the pumps 100, 104 connected to the collecting pipe 110a, respectively, and a bypass route 140 is connected between the discharge pipe 106b of the main pump 100 and the suction pipe 108c of the sub-pump 104. The bypass route 140 comprises the bypass pipe 140a and a triple check valve 140b disposed in the bypass pipe 140a, in which the check valve 140b opens when the discharge pipe 106b is brought under a negative pressure state, so that the bypass route 140 serves as a communication route through which hydraulic oil flows in the direction of a broken-line arrow.

The relief route 116 connected to the collecting pipe 110a at the upstream side of the oil element 112 comprises a relief pipe 116a with its end 114 connected to the lubricating system, and a spring-type double check valve 116b disposed in the relief pipe 116a. When a filter of the oil element 112 is clogged and thereby the pressure at the upstream side of the oil element 112 reaches or exceeds a predetermined value, the check valve 116b opens and serves as a communication route through which hydraulic fluid flows in the direction of a broken line arrow.

The line-pressure regulating valve 118 comprises an internal-pilot and spring-type pressure reducing valve, in which a spool is slidably arranged in a cylindrical valve housing having an input port 118A connected to the collecting pipe 110a, an output port 118B connected to the lubricating system 114, and internal-pilot ports $118P_1$ and $118P_2$ to which primary and secondary pressures are fed through fixed orifices. The spool is urged by a return spring 118a toward one end of the valve housing. Then, a feed pressure PL raised by the main pump 100 or sub-pump 104 is reduced to a predetermined value by the line-pressure regulating valve 118, and fed to the electromagnetic switching valve 120, clutch-pressure regulating valve 122 and pressure reducing valve 124. The hydraulic fluid discharged from the output port 118B, when the pressure is reduced to the predetermined value, is returned to the lubricating system 114.

The clutch-pressure regulating valve 122 comprises an internal-pilot, external-pilot and spring-type pressure-regulating valve, in which a spool is slidably arranged in a cylindrical valve housing having an input port 122A connected with the pipe 110c, an output port 122B connected with the pilot switching valve 126, an internal-pilot port $122P_1$ to which a secondary pressure is fed through a fixed orifice as a pilot pressure, and an external-pilot port $122P_2$ to which a control pressure is fed from the duty-control solenoid valve 128. The spool is urged by a return spring 122a toward one end of the valve housing. The clutch-pressure regulating valve 122 does not output a secondary pressure because the communication route between the input port 122A and the output port 122B is closed when a control pressure is not fed from the duty-control solenoid valve 128, though it outputs a secondary pressure corresponding to a pilot control pressure from the output port 122B as the clutch pressure Pc, because the movement of the spool is controlled when the pilot control pressure is fed from the duty-control solenoid valve 128.

The pressure reducing valve 124 comprises an internal-pilot and spring-type pressure reducing valve generating a constant secondary pressure, in which a spool is slidably arranged in a cylindrical valve housing having an input port 124A connected with the pipe 110e, an output port 124B connected with the duty-control solenoid valve 128, an internal-pilot port 124P to which a secondary pressure is fed from the output port 124B as a pilot pressure through a fixed orifice, and a drain port 124H. The spool is urged by a return spring 124a toward one end of the valve housing. When the spool is moved to a predetermined position by the pilot pressure fed to the internal-pilot port 124P, a primary pressure fed from the input port 124A is fed to the duty-control solenoid valve 128 as a control pressure reduced to a predetermined value.

The duty-control solenoid valve 128 is formed into a 3-port 2-position type, in which a spool is slidably arranged in a cylindrical valve housing having an input port 128A connected to the pressure reducing valve 124 side, a drain port 128R connected to the drain side, an output port 128B connected with an external-pilot port $122P_2$ of the clutch-pressure regulating valve 122, and a return spring 127a for the spool. The spool is movable between a normal position 128b where the output port 128B connects with the drain port 128R, and a working position where the input port 128A connects with the output port 128B. When an exciting current $i_0$ at a required duty ratio is fed from the controller 18 to a solenoid 128d, a pilot control pressure corresponding to the duty ratio is output to the clutch-pressure regulating valve X22 because the spool is moved from the normal position 128b to the working position 128c against the return spring 128a while the exciting current $i_0$ is turned on. Therefore, in the case of the clutch-pressure regulating valve 122, when a control pressure is fed from the duty-control solenoid valve 128 to the external-pilot port $122P_2$, a clutch pressure Pc corresponding to the pilot control pressure is output to control the fastening force of the friction clutch 66 corresponding to the clutch pressure Pc, so that a driving torque corresponding to the clutch pressure Pc is distributed to the front wheels.

The electromagnetic switching valve 120 of the spring-offset type is formed into a 3-port 2-position type, in which a spool is slidably arranged in a valve housing having an input port 120A to which a line pressure is fed, an output port 120B connected with an external-pilot port $126P_1$ of the pilot switching valve 126, and a drain port 120D and set. The spool is movable between a normal position 120b for cutting off the input port 120A and connecting the output port 120B with the drain port 120D, and a working position 120c where the input port 120A connects with the drain port 120B and cuts off the drain port 120D. In the case of the electromagnetic switching valve 120, when an exciting current $i_1$ is output from the controller 18 to a solenoid 120d, the spool is moved to the working position 120c against a return spring 120a and a pilot control pressure is fed to the external-pilot port $126P_1$ of the pilot switching valve 126 while the exciting current $i_1$ is turned on. When the exciting current $i_1$ fed from the controller 18 is turned off, the spool is returned to the normal position 120b by the pressure of the return spring 120a and the pilot control pressure fed to the external-pilot port $126P_1$ is cut off through the drain port 120D.

Figure 5:
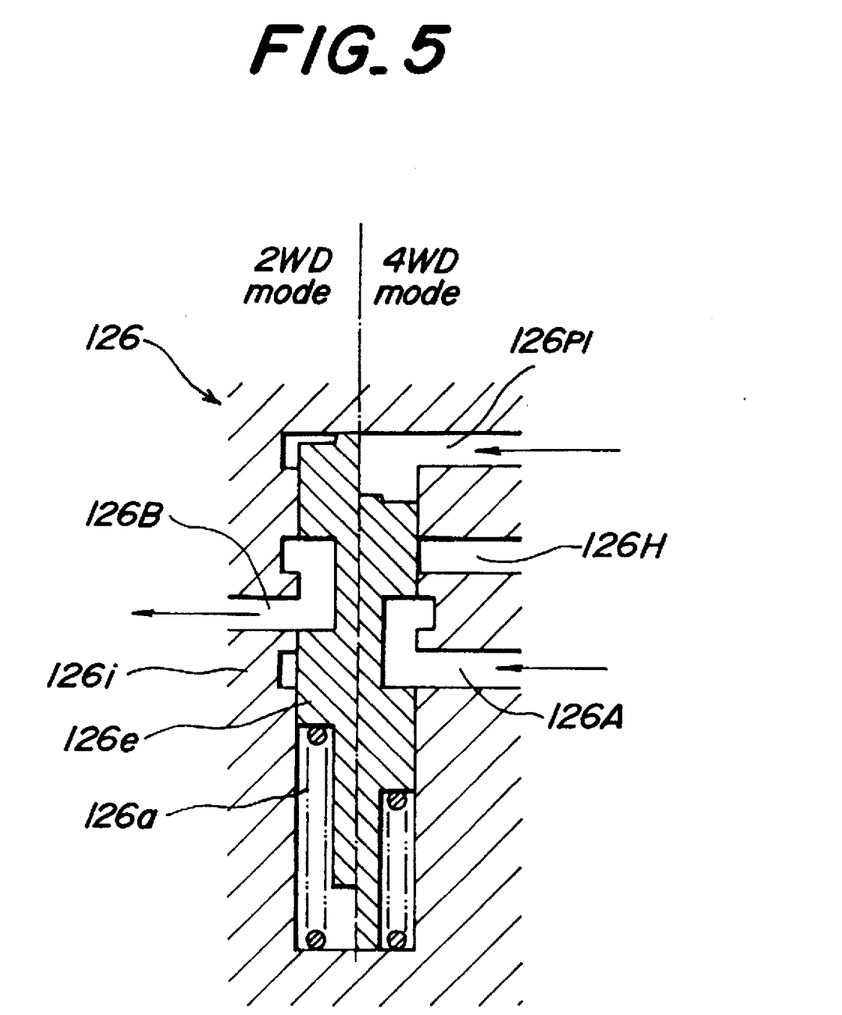
FIG. 5 is an illustration showing a switching valve used for oil pressure feeder of the present invention.

In the case of the pilot switching valve 126, as shown in FIG. 5, a spool 126e is slidably arranged in a cylindrical valve housing 126i having an input port 126A to which a secondary pressure is fed from the clutch pressure regulating valve 122, an output port 126B for feeding the secondary pressure to the transfer 22, an external-pilot port $126P_1$ to which a control pressure is fed while the solenoid 120d of the electromagnetic switching valve 120 is turned on, and a drain port 126H. The spool 126e is urged by a return spring 126a toward one end of the valve housing.

When the pilot control pressure is not fed to the external-pilot port $126P_1$, the input port 126A is disconnected from the output port 126B and the spool 126e of the pilot switching valve 126 is moved to a 2WD mode position 126b where the output port 126B connects with the drain port 126D (left half state in FIG. 5). When the solenoid 120d of the electromagnetic switching valve 120 is turned on, the spool of the electromagnetic switching valve 120 is moved to the second position 120c to feed a control pressure to the external-pilot port 126P$_1$ and then moved to the 4WD mode position 126c where the input port 126A connects with the output port 126B (right half state in FIG. 5).

As described above, by driving the pilot switching valve 126 with a pilot control pressure fed from the electromagnetic switching valve 120, it is possible to drive the spool 126e with a high pilot control pressure and securely slide the spool 126e even if the spool 126e has a large sliding resistance due to dust or chips attached to the sliding surface for the spool 126e.

The controller 18 outputs the exciting current $i_0$ or $i_1$ to the oil pressure feeder 16 in accordance with a detection signal output from the high-speed shift position sensor 86, the low-speed shift position sensor 88, or a 2WD-4WD mode sensor 90. In this embodiment, the same controller 18 controls the oil pressure feeder 16 so that the feeder 16 can keep a predetermined pressure. To control the feeder 16, the controller 18 is provided with the oil temperature sensor 130a and the oil pressure switches 132 and 134. Furthermore, a control signal CS2 according to a detection signal sent from the sensor 130 of the switch 132 or 134 is output to the oil pressure feeder 16 from the controller 18.

Figure 6:
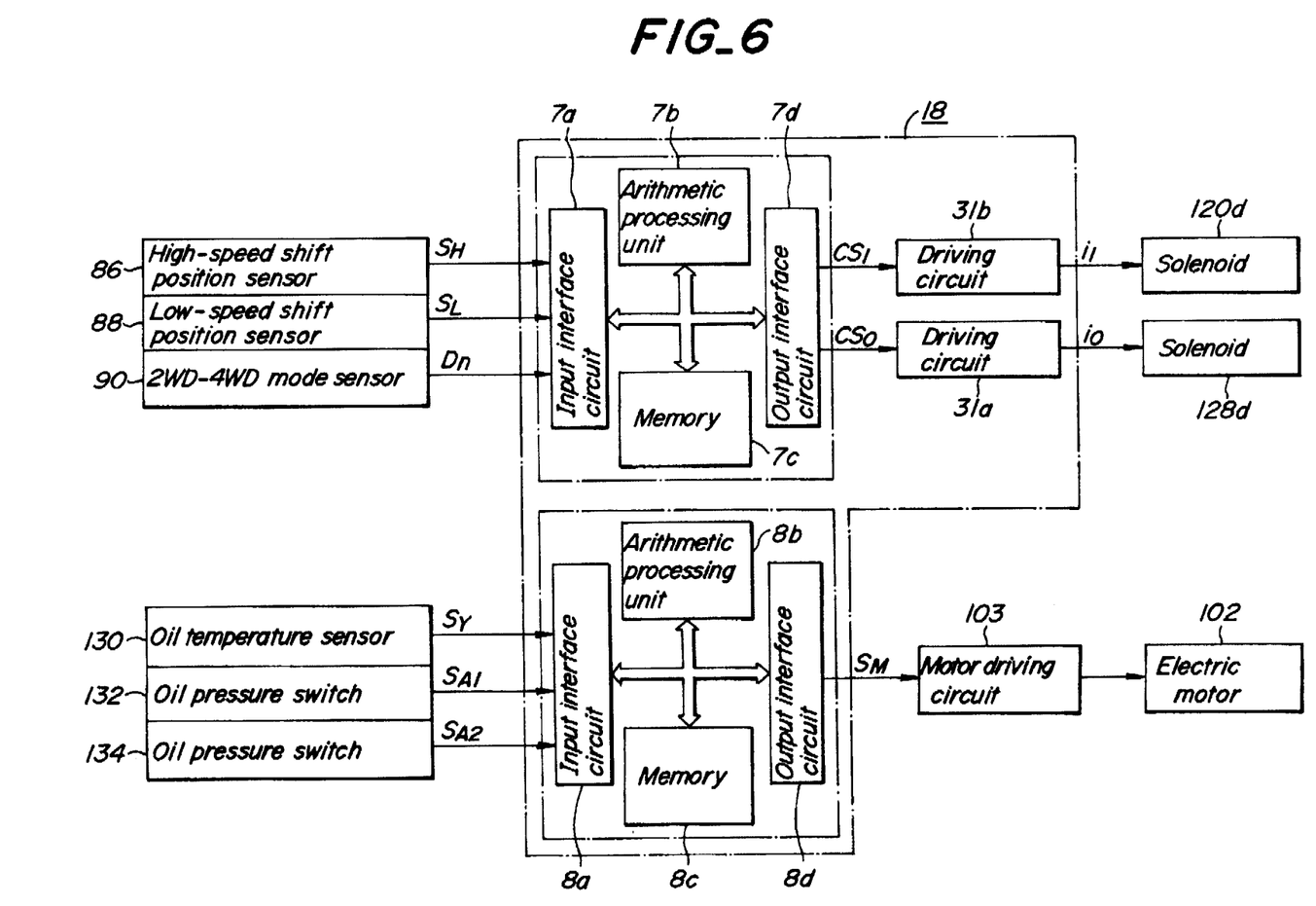
FIG. 6 is a block diagram showing the controller of the present invention.

As shown in FIG. 6, the controller 18 comprises a microcomputer 7 for performing the driving-force distribution control, a microcomputer 8 for performing the predetermined-oil-pressure keeping control, a driving circuit 31a for feeding the exciting current $i_0$ at a required duty ratio to the solenoid 128d of the duty-control solenoid valve 128 in the oil pressure feeder 16 in accordance with a control signal CS0 sent from the microcomputer 7, a driving circuit 31b for feed the exciting current $i_1$ to be turned on/off in accordance with a control signal CS1 sent from the microcomputer 7 to the solenoid 120d of the electromagnetic switching valve 120 in the oil pressure feeder 16, and a motor driving circuit 103 for chopper-controlling the sub-motor 102 so as to control the rotational speed of the sub-motor 120 to a value corresponding to a motor control signal SM sent from the microcomputer 8.

The microcomputer 7 comprises an input interface circuit 7a having an A/D conversion function for reading a signal detected by the sensor 86, 88, or 90 as a detected value, an arithmetic processing unit 7b for performing operation (see FIG. 9) for driving-force distribution control in accordance with a predetermined program, a memory 7c such as a ROM or RAM, and an output interface circuit 7d for outputting a control signal CS0 at a duty ratio D for commanding the clutch pressure Pc to determine the front-wheel torque distribution obtained by the arithmetic processing unit 7b, and a control signal CS1 for determining whether to output the clutch pressure Pc. Moreover, the microcomputer 8 comprises an input interface circuit 8a having an A/D conversion function for reading a signal detected by the sensor 130, 132, or 134 as a detected value, an arithmetic processing unit 8b, a memory 8c such as a ROM or RAM, and an output interface circuit 8d having a D/A conversion function for outputting a sub-motor rotational-speed command value obtained by the arithmetic processing unit 8b as, for example, an analog voltage signal SM.

Furthermore, the microcomputer 7 sets a front-wheel torque-distribution command value T2 through operation (not shown) in accordance with a mode signal Dn sent from the 2WD-4WD mode sensor 90, a high-speed shift-position detection signal $S_H$ sent from the high-speed shift position sensor 86, or low-speed shift-position detection signal $S_L$ sent from the low-speed shift position sensor 88, computes a duty ratio D for specifying a clutch pressure Pc corresponding to the value T2, outputs the control signal CS0 of a command value corresponding to the duty ratio D, turns on/off the control signal CS1, and outputs the control signals CS0 and CS1 to the driving circuits 31a and 31b.

The driving circuit 31a is provided with, for example, a pulse-width modulation circuit for outputting an exciting current at the duty ratio D corresponding to a command value of the control signal CS0 comprising an analog signal output from the microcomputer 7, so that the exciting current $i_0$ at the duty ratio D corresponding to the command value of the control signal CS0 is sent to the solenoid 128d of the duty-control solenoid valve 128. Moreover, the driving circuit 31b converts the control signal CS1 output from the microcomputer 7 to the exciting current $i_1$ with a current value capable of exciting the solenoid 120d of the electromagnetic switching valve 120.

The operation performed by the controller 18 of this embodiment, that is, the control for allowing the oil pressure feeder 16 to feed a predetermined oil pressure is performed to control the rotational speed of the sub-motor 102 and keep the line pressure PL outputting from the oil pressure feeder 16 at a predetermined value, by computing the control signal SM showing a rotational-speed command value set in accordance with an oil temperature detection value SY output from the oil temperature sensor 120, and feeding the control signal SM to the motor driving circuit 103 in order to control the discharge pressure (amount of oil) of the sub-pump 104 when detecting that the line pressure PL at the downstream side of the oil element 112 of the collecting pipe 110a decreases to a set value or less by the oil pressure switch 132 through operation, not shown.

In this case, a program and fixed data necessary for execution of processings by the arithmetic processing unit 7b are previously stored in the memory 7c of the microcomputer 7 and the processing results can be temporarily stored.

Figure 7:
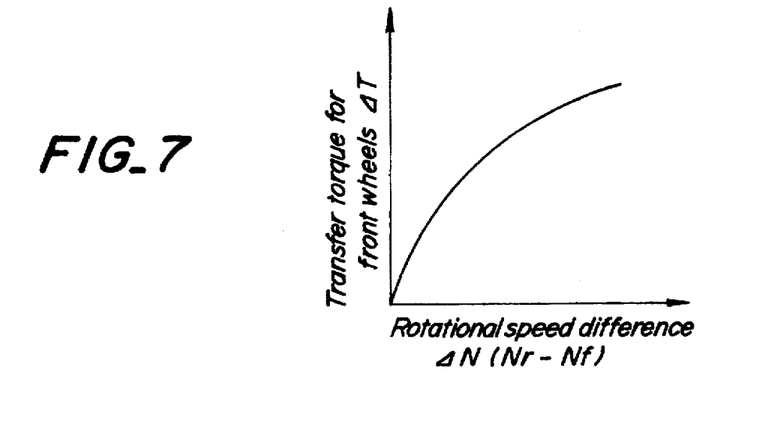
FIG. 7 is a control characteristic graph of transfer torque of the front wheels versus a difference of rotational speed between the front and rear wheels.
Figure 8:
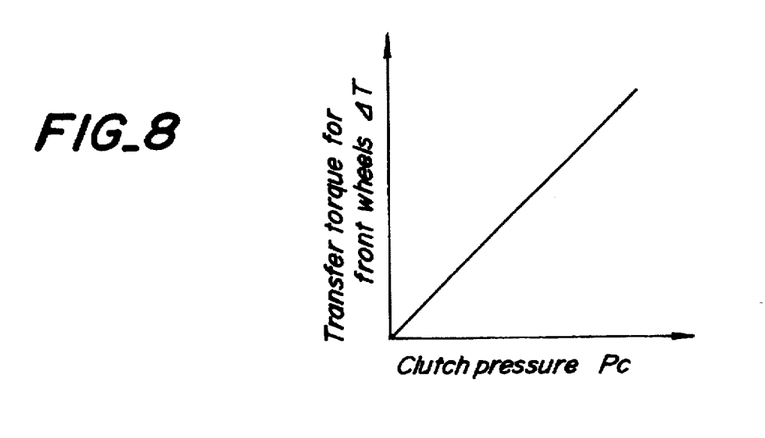
FIG. 8 is a control characteristic graph of transfer torque of the front wheels versus the clutch pressure fed from an oil pressure feeder.
Figure 9:
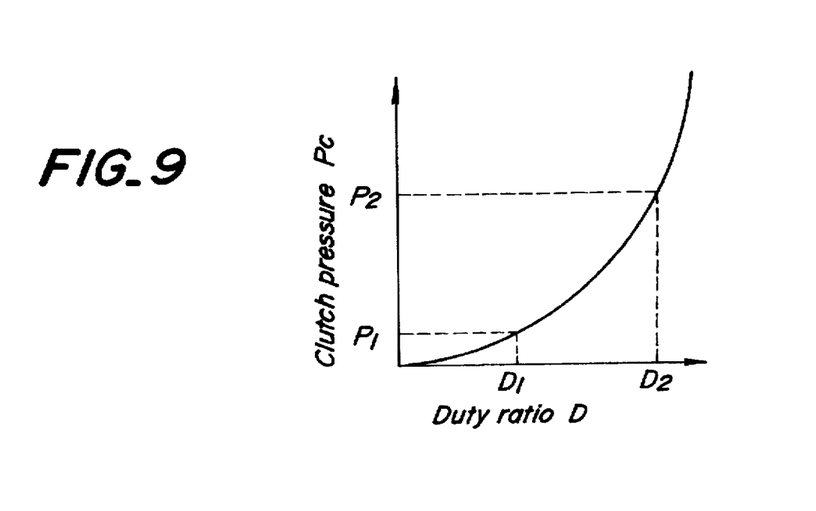
FIG. 9 is a control characteristic graph of the clutch pressure versus a duty ratio.

The fixed data includes a storage table corresponding to each of the control characteristics shown in FIGS. 7 to 9. FIG. 7 shows the control characteristic of a transfer torque ΔT for the front wheels to a difference ΔN of rotational speed between the front and rear wheels. From FIG. 7, it can be seen that the transfer torque ΔT is non-linearly increased in accordance with increase of the rotational-speed difference ΔN for driving-force distribution. FIG. 8 shows the value of the transfer torque ΔT for the front wheels linearly changing in accordance with the change of the clutch pressure Pc of the pilot switching valve 126. FIG. 9 shows the clutch pressure Pc of the clutch-pressure regulating valve 122 non-linearly increasing in the form of a parabola in accordance with increase of the duty ratio D of the exciting current value $i_0$ to be fed to the solenoid 128d of the duty-control solenoid valve 128.

When the transfer torque ΔT is determined by referring to the storage table corresponding to FIG. 7 in accordance with the rotational-speed difference ΔN between the front and rear wheels by the microcomputer 7, the value of the duty ratio D, which must be output by the controller 18, is inversely computed by successively referring to the storage tables corresponding to FIGS. 8 and 9. When a clutch pressure between P$_1$ and P$_2$ corresponding to a duty ratio in the range of D1 to D2 shown in FIG. 9 is fed to the friction clutch 66, a predetermined torque distribution ratio corresponding to the fastening force of the friction clutch 66 is continuously changed from a rear-to-front wheel ratio of 100%:0% to 50%:50%.

The driving-force transfer route of the transfer 22 according to range selection of a sub-transmission lever and the traveling state of a vehicle will be described below.

The following four modes can be set for the sub-transmission lever: rear two-wheel driving high-speed range (2H range), four-wheel driving high-speed range (4H range), neutral range (N range) and four-wheel driving low-speed range (4L range). When the 4L or 4H range is selected, the four-wheel driving mode signal Dn is input to the controller 18 from the 2WD-4WD mode sensor 90. The range selection pattern is typically in the sequence of 2H range, 4H range, N range and 4L range.

When the N range is selected, the shift sleeve 6b slides up to the neutral position N as shown at the upper side in FIG. 3. In this case, no wheel is driven because the shift sleeve 64b does not engage with the high-speed shifting gear 6c, low-speed shifting gear 64d, or four-wheel driving gear 80 and does not establish a power transfer route.

When the 2H range is selected, the two-wheel driving mode signal Dn is input to the controller 18 from the 2WD-4WD mode sensor 90, though the controller does not perform oil pressure feed control and the clutch pressure Pc is not fed to the input port 74 of the transfer 22. Then, the shift sleeve 64b slides up to the high-speed position H shown at the upper side in FIG. 3 and the internal gear $64b_1$ engages with the high-speed shifting gear 64c. Therefore, the driving force of the input shaft 42 is transferred as a high-speed rotational driving force through a transfer route formed with the high-speed shifting gear 64c, internal gear $64b_1$, and first output shaft 44. Moreover, the friction plates 66b and the friction disks 66d of the friction clutch 66 are not fastened and the transfer route to the second output shaft 54 is not secured. The vehicle can thus travel under a high-speed two-wheel-drive state.

When the 4H range is selected, the four-wheel driving mode signal Dn is input to the controller 18 from the 2WD-4WD mode sensor 90 and therefore, the controller 18 outputs the control signal CS0 of a command value corresponding to the range of D1 to D2 to the solenoid 128d of the duty-control solenoid valve 128 to control the clutch-pressure regulating valve 122. Thereby, a secondary pressure in the range of $P_1$ to $P_2$ is output from the clutch-pressure regulating valve 122 and fed to the input port 74 for the friction clutch 66 through the switching valve 126 as the clutch pressure Pc. Then, the driving force of the input shaft 42 is transferred as a high-speed rotational driving force through a transfer route formed by the high-speed shift gear 64c, internal gear $64b_1$, and first output shaft 44. The high-speed rotational driving force of the first output shaft 44 is further transferred as a high-speed rotational driving force through a transfer route formed by the friction clutch 66 fastened at a predetermined torque distribution ratio, first sprocket 68, chain 72, second sprocket 70, and second output shaft 54. Therefore, the vehicle can travel under a high-speed four-wheel-drive state.

When the 4L range is selected, the shift sleeve 64b slides up to the low-speed position L shown at the lower side in FIG. 3 and the four-wheel driving gear 80 engages with the internal gear $64b_1$ simultaneously when the low-speed shifting gear 64d engages with the external gear $64b_2$. Then, because the low-speed shifting gear 64d rotates at a low speed compared to the input shaft 42 by the planetary gear set 62, the driving force of the input shaft 42 is transferred as a low-speed rotational driving force through a transfer route formed by the low-speed shifting gear 64d, external gear $64b_2$, internal gear $64b_1$, and first output shaft 44. At the same time, the low-speed rotational driving force of the first output shaft 44 is transferred as a low-speed rotational driving force through a transfer route formed by the internal gear $64b_1$, four-wheel driving gear 80, first sprocket 68, chain 72, second sprocket 70, and second output shaft 54. Therefore, the vehicle can travel under a low-speed four-wheel-drive state.

In this case, when the 4L range is changed to the 4H range while the vehicle is stopped, by setting the automatic transmission 20 to the N range, no load is applied to the input shaft 42 because the shift sleeve 64b does not engage with the high-speed shifting gear 64c or low-speed shifting gear 64d after the shift sleeve 64b moves from the low-speed position L up to the neutral position N. At this point of time, a free-running torque is transferred to the input shaft 42 from the automatic transmission 20 through the output shaft 56. However, the friction members 47 in the form of O-rings 47 arranged on the outer periphery of the stopped first output shaft 44 contacts the inner periphery 42c of the input shaft 42, so that the rotation of the input shaft 42 is controlled by the friction force of the O-ring When the shift sleeve 64b moves up to the high-speed position H, the internal gear $64b_1$ engages with the high-speed shifting gear 64c with its rotation controlled. Therefore, it is possible to decrease gear screeches while effecting changeover from the 4L range to the 4H range.

Also, when the 4H range is changed to the 4L range, the shift sleeve 64b temporarily moves from the high-speed position H to the neutral position N and no load is applied to the input shaft 42. At this point of time, a free-running torque is transferred to the input shaft 42 from the automatic transmission 20 through the output shaft 56. However, the rotation of the input shaft 42 is controlled by the friction force of the O-ring 47. When the shift sleeve 64b moves up to the low-speed position L, the external gear $64b_2$ engages with the low-speed shifting gear 64d with its rotation controlled. Therefore, it is possible to decrease gear screeches even while the 4H range is changed to the 4L range.

The O-ring 47 slides on the inner periphery 42c of the input shaft 44 only when a vehicle selecting the 4L range travels under a low-speed four-wheel-drive state, and during the changeover of 4H and 4L ranges. When the 2H or 4H range is selected, the input shaft 42 and the first output shaft 44 have the same rotational speed so that the O-ring 47 does not slide on the inner periphery 42c of the input shaft 42. Therefore, the O-ring 47 does not affect fuel consumption of the vehicle traveling under a high-speed two-wheel- or four-wheel-drive state.

In accordance with the illustrated embodiment, it is possible to decrease gear screeches during the changeover between the 4L and 4H ranges because the O-ring 47 arranged on the outer periphery of the stopped first output shaft 44 contacts the inner periphery 42c of the input shaft 42, so that the rotation of the input shaft 42 is controlled by the friction force of the O-ring 47, and the internal gear $64b_1$ engages with the high-speed shifting gear 64c with its rotation suppressed when the 4H range is selected, or the external gear $64b_2$ engages with the low-speed shifting gear 64d with its rotation suppressed when the 4L range is selected.

It will be readily appreciated from the foregoing description that the present invention provides transmission suitable for a sub-transmission of a transfer unit and makes it possible to reduce gear screeches during a changeover between high- and low-speed positions even if a hydrodynamic automatic transmission is used and a free-running torque is transmitted to the input shaft.

While the present invention has been described above with reference to a specific embodiment, it has been presented by way of example only, and various changes or modifications may be made without departing from the scope of the invention as defined by the appended claims.

We claim:

1. A sub-transmission for a transfer-unit comprising:

an input shaft adapted for receiving a driving force from an automatic transmission and an output shaft, which shafts are facing each other and are rotatable relative to each other and collinearly aligned, the input shaft having, a high-speed gear and a low-speed gear for reducing the rotational speed of the input shaft, and a shift sleeve axially movably arranged on the output shaft to selectively engage the high- and low speed gears for transferring the driving force of the input shaft to the output shaft as a high- or low-speed driving force, wherein the output shaft has a friction member contacting the input shaft to generate a frictional force sufficient to overcome the driving force from the automatic transmission at a neutral state to decrease the rotational speed of the input shaft.

2. The sub-transmission according to claim 1, wherein the input shaft has an axial recess formed at one end of the input shaft and one end of the output shaft is inserted in the axial recess, wherein the friction member is positioned in the axial recess between the input and output shafts and engages the ends of both the input and output shafts.

3. The sub-transmission according to claim 2, wherein the friction member comprises an O-ring.

4. The sub-transmission according to claim 4, wherein the O-ring is fitted over the output shaft end.

* * * * *